United States Patent Office 3,528,447
Patented Sept. 15, 1970

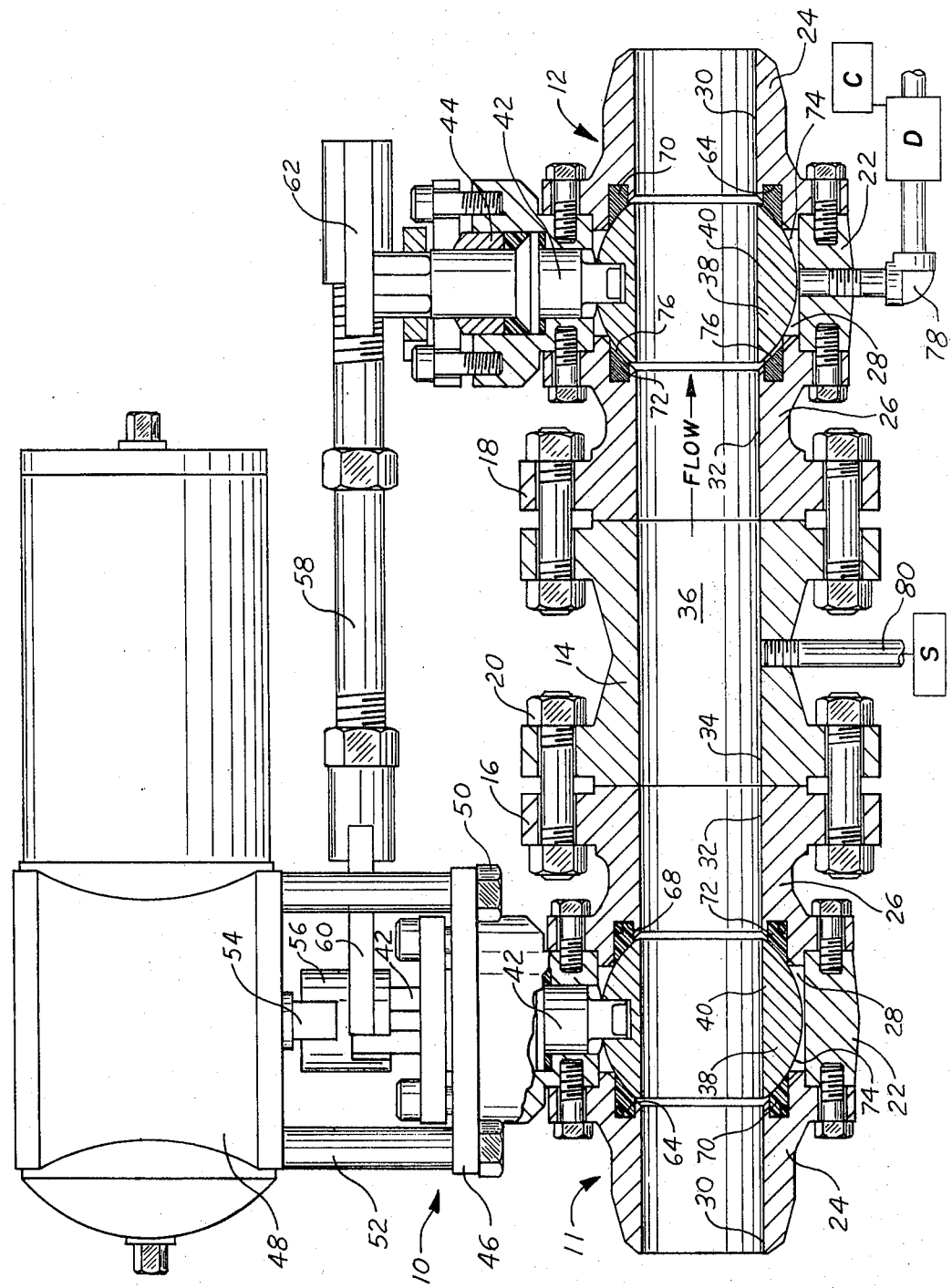

3,528,447
TANDEM BALL VALVE ASSEMBLY WITH PURGING AND LEAK SENSING MEANS
John P. Kolb, Houston, Tex., assignor to ACF Industries, Incorporated, New York, N.Y., a corporation of New Jersey
Filed Feb. 10, 1969, Ser. No. 797,784
Int. Cl. F17d 3/04
U.S. Cl. 137—240                                    7 Claims

ABSTRACT OF THE DISCLOSURE

A simultaneously actuated tandem valve assembly including a pair of valves which are interconnected to form a common flow passage. Each of the valves includes a valve element which is movable between open and closed positions to control the flow of fluid through the valve. Each of the valves is provided with upstream and downstream seat members which engage the associated valve element. The seat members of the upstream valve are more susceptible to wear than the seat members of the downstream valve so that leakage caused by wear or erosion always occurs first in the upstream valve, thereby assuring positvie sealing of the downstream valve when such leakage occurs. Sensing means is provided to detect leakage of fluid past the seats of the upstream valve so that a signal is given immediately upon leakage thereof. The tandem valve assembly is also provided with a purge system which is capable of purging the common flow passage of undesired accumulations of leaked fluid.

BACKGROUND OF THE INVENTION

This invention is generally directed to valve structures and more particularly is directed to a tandem valve structure including at least two interconnected valves and which is capable of controlling flowing fluid through a flow passage which is common to both valves. The tandem valve assembly is designed particularly for service under conditions where corrosive matter may be entrained in a fluid such as gas and which corrosive matter has a tendency to erode valve parts and cause leakage thereof. A primary consideration for development of the invention is valve service under conditions which may become highly undesirable and perhaps dangerous in the event the valve assembly should develop a leak.

For example, it has been found that in adapting the furnaces of power plants from firing by coal gas to natural gas firing, the cold gas feed lines frequently contain deposits of coal tar residue, which is in the form of a fine talcum-like ash. This ash is extremely abrasive and tends to erode away the seat members of valve assembly, thereby causing the leakage of natural gas into a power plant furnace. A gas leakage condition of this nature is obviously highly dangerous due to the possibility of explosion.

It is, therefore, a primary object of this invention to provide a novel tandem valve assembly which is capable of effecting positive shutoff of the flow of fluid at all times and which is capable of indicating when the seat members of the valve assembly are becoming sufficiently worn that leakage might occur.

It is an even further object of this invention to provide a novel tandem valve assembly which incorporates upstream and downstream valves, which are so designed that any leakage which may occur will always occur in the upstream valve, thereby assuring positive sealing at the downstream valve at all times. It is also an important object of this invention to provide a novel tandem valve assembly which incorporates upstream and downstream valves and which assembly includes means for immediately sensing and signaling the presence of gas in the event of leakage.

Among the several objects of this invention is contemplated the provision of a novel tandem valve assembly including upstream and downstream valves defining a common flow passage and also including means to purge the common flow passage between the upstream and downstream valves to assure elimination of undesirable fluid therebetween.

It is an even further object of this invention to provide a tandem valve assembly including a downstream valve which is so designed that the valve chamber thereof may be purged of undesirable fluid along the the common flow passage defined by the valve assembly.

It is also an object of this invention to provide a novel tandem valve assembly which is simple in nature, reliable in use and low in cost.

Other and further objects, advantages and features of this invention will become apparent to one skilled in the art upon consideration of the written specification, the attached claims and the annexed drawings. The form of the invention, which will now be described in detail, illustrates the general principals of the invention, but it is to be understood that this detailed description is not to be taken as limiting since the scope of the invention is best defined by the appended claims. Such description will be referred to by reference characters in the drawing, which is an elevational view of the tandem valve assembly of this invention having the valve operator illustrated in full line and the tandem valve assembly thereof broken away and illustrated in section.

Briefly, the invention concerns a pair of ball valves which are interconnected by means of a generally tubular spool to define a common flow passage. The ball valves each include a spherical valve element and upstream and downstream seat members which establish engagement with the spherical working surface of the valve elements. The seat members of the upstream valve are designed to be more susceptible to wear and erosion than the seat members of the downstream valve, thereby assuring that the upstream valve will begin to leak first as the seat members thereof are eroded and worn by abrasive material entrained in the fluid controlled by the valve assembly. The downstream valve includes an upstream seat which is prevented from establishing sealing engagement with the working surface of the valve element by a least one and preferably a plurality of slots which are formed in the sealing face thereof. The slots allow fluid within the common flow passage to flow past the upstream seat of the downstream valve into the valve chamber thereof. Apparatus for detecting or sensing the presence of gas, such as natural gas, for example, is connected to the valve chamber of the downstream valve by means of conduit structure. In the closed position of both valves, in the event the upstream valve should be worn or eroded sufficiently that leakage will occur, the leaked gas will flow into the common flow passage past the upstream seat of the downstream valve and into the valve chamber of the downstream valve. Since the downstream seat of the downstream valve will be maintaining fluid-tight sealing engagement, the gas will flow outwardly of the valve chamber through an exit conduit and through the gas detecting apparatus, which, upon detecting the presence of natural gas, will actuate visual or audible signal means. Upon receiving a signal indicating leakage of natural gas past the upstream valve, personnel at the facility involved will become immediately aware that the valve assembly is in need of repair. The valve assembly may then be repaired without endangering leakage of natural gas past the downstream valve. To further prevent the development of a dangerous or undesirable condition, the common flow passage between the upstream and downstream valves may be purged at all times by a fluid such as air or purging may occur automatically upon the detection of natural gas by the detecting mechanism.

Referring now to the drawings for a more detailed description of the invention, a tandem valve assembly which is illustrated generally at 10, includes an upstream valve 11 and a downstream valve 12 interconnected by means of a generally tubular spool 14. The spool 14 is connected to flanges 16 and 18 of valves 11 and 12 respectively by a series of bolts 20.

Each of the valves 11 and 12 comprises a central body portion 22, to which is bolted end sections 24 and 26, forming closures for the body section and cooperating with the body section to define a central valve chamber 28. The end members 26 include an integral flanged portion 16, which is adapted to receive the bolts 20 and establish connection with the spool 14. The end members 24 of each valve may be formed for welded connection to conduit structure as illustrated in the drawings or flanges or any other suitable connection structure may be provided for connecting the valve to conduit structure without departing from the spirit or scope of this invention. The end members 24 and 26 are provided with inlet and outlet passages 30 and 32, which are disposed in fluid communication with the valve chambers 28 and which cooperate with a flow passage 34 formed in the spool 14 to define a common flow passage for the tandem valve assembly.

A spherical valve element or plug 38 is disposed within the valve chamber 28 of each valve and is rotatable between the open position illustrated in the drawings and a closed position to control the flow of fluid through the common flow passage 36. The valve elements 38 are provided with flow passages 40 which are disposed in registry with the inlet and outlet passages 30 and 32 of each valve. For imparting rotation to the valve element 38, each of the valves is provided with valve stems 42 disposed in nonrotatable relation with the associated valve element. The valve stems 42 extend through openings in the valve body and are sealed with respect to the valve body by packing assemblies 44.

An operator adapter plate 46 is connected to the upstream valve body 22 in any desired manner, and is adapted for connection thereto of a valve actuator 48 by means of bolts 50 which extend through tubular supports 52. An output drive 54 of the actuator 48 is established in nonrotatable driving relation with the stem 42 of the upstream valve by a nonrotatable connection device 56. Simultaneous and corresponding actuation of the downstream valve 12 is achieved through a linkage assembly including an actuator arm 58 which is pivotally connected to actuating levers 60 and 62 nonrotatably connected to the valve stems of the upstream and downstream valves respectively. Rotation of the actuator drive 54 will induce simultaneous actuation of the upstream and downstream valves.

Each of the end members 24 and 26 of each of the valves is provided with a seat recess 64 and 68, respectively, in which is disposed annular seat members 70 and 72 establishing engagement with the working surface 74 of the rotatable valve element 38. Both seat members of the upstream valve and the downstream seat member of the downstream valve establish sealing engagement with the working surface 74 of the valve element 38 while the upstream seat member of the downstream valve is prevented from establishing sealing engagement for purposes which will be set forth in detail hereinbelow.

The seat members of the upstream valve are composed of different material than the downstream seat member of the downstream valve in order to assure that the seat members of the upstream valve are more susceptible to wear and will begin to leak first upon wear or erosion caused by particulate material entrained in the gaseous fluid flowing through the valve assembly. The upstream seat of the downstream valve may be composed of the same type of material as the seats of the upstream valve because it is intended that this seat not be capable of sealing engagement. A plurality of slots 76, are formed in the sealing face of the upstream seat 72 of the downstream valve in order to allow the flow of fluid from the common flow passage past this seat and into the valve chamber 28 of the downstream valve. The downstream seat of the downstream valve, however, is composed of material which is less susceptible to wear than the seat members of the upstream valve, thereby assuring that the downstream seat of the downstream valve will be establishing a fluid-tight seal when the upstream valve begins to leak.

The tandem valve assembly is provided with a gas detecting mechanism shown schematically D which is capable of detecting the presence of natural gas or any other specific gaseous substance. Gas detection mechanism D is connected through conduit 78 in fluid communication with the valve chamber 28 of the downstream valve. Natural gas, which may leak past the upstream valve, assuming that wear or erosion has occurred, will flow past the upstream seat of the downstream valve by way of the slots 76, thereby entering the valve chamber 28. The leaked gas will then exit from the valve chamber 28 through the conduit 78 and will flow through the gas detection mechanism D. Immediately upon detecting the presence of natural gas, the detecting mechanism will relay a signal to a control facility C which signal may be audibly or visually recognized by control personnel.

As a further precautionary measure against the development of a dangerous condition in the event the upstream valve should begin to leak, a source S of purging fluid such as air is communicated to the common flow passage 36 by a conduit 80. The purging fluid may be introduced into the common flow passage 36 at all times while the valve elements 38 are in their closed position or purged fluid may be introduced automatically upon detection of natural gas by the detection mechanism for the purpose of diluting the natural gas to a noncombustible level and to insure that a combustible quantity of natural gas does not fill the common flow passage 36.

In operation, the valve elements 38 will be rotated to their open position as illustrated in the drawing by the actuator 48, thereby allowing the flow of gaseous fluid through the common flow passage and through both the upstream and downstream valves. The valve actuator may then induce rotational movement of the valve elements 38 to their closed position to cease the flow of fluid through the tandem valve assembly. The upstream valve will ordinarily establish positive sealing and will prevent the gaseous medium controlled by the valve assembly from flowing into the common flow passage. In the event the upstream valve assembly should have become worn or eroded to the point that sealing is impossible, the gas will flow past the upstream valve into the common flow passage and into the valve chamber 28 of the downstream valve through the slot 76 of the upstream seat 72 of the downstream valve as described above.

The leaked fluid will then flow through the conduit 78 to the gas leakage detection mechanism D, which in turn will transmit an audible or visual signal to a control facility to make control personnel aware that such leakage has occurred. To repair the valve assembly, it is necessary only to remove the spool 14 by simply removing the bolts 20 therefrom. The end members 26 of each of the valves then may be unbolted and removed, thereby gaining access to the valve chambers 28. The spherical valve elements then may also be simply removed through the end opening to expose the upstream seat of the upstream valve and the downstream seat of the downstream valve. The valve seat members 70 and 72 of both the upstream and downstream valves then may be replaced and the valves may be reassembled by bolting on the end members 26 to each valve. The repair operation is completed by inserting the spool 14 into place and bolting it to the end members 26. The bolted connection insures repair of both valves of the valve assembly without the necessity of removing either of the valves from the conduits to which they are attached. Nor is it necessary to disconnect the actuator structure or the gas sensing mechanism in any way to achieve disassembly of the valve mechanism for repair. The purge fluid conduit 80 may be composed of flexible material so that any necessity for disconnecting it from the spool will be eliminated.

It will be evident from the foregoing that I have provided a novel tandem valve assembly which includes a pair of valve members connected together to form a common flow passage and which valves are provided with a seat arrangement allowing the seat members of the upstream seat to become eroded or worn before the downstream valve seat members can become worn sufficiently to cause leakage. Means for detecting the leakage of fluids such as natural gas is communicated to the common flow passage downstream of the upstream valve so that leakage may be detected immediately upon occurrence thereof and appropriate signals may be provided for control personnel so that repair of the valve assembly can be scheduled. I have prevented sealing between the upstream seat of the downstream valve and the valve element of the downstream valve in order to allow the flow of leaked fluid and gaseous purging fluid into the valve chamber of the downstream valve so that these fluids may exit through appropriate conduit structure to the leakage detection mechanism. The gaseous purging structure of this invention positively assures against the accumulation of leaked fluid within the common flow passage to a sufficient degree that the same becomes dangerous, either by continuously purging the common flow passage and the valve chamber of the downstream valve or by automatically purging the same upon detection of leakage past the seat assemblies of the upstream valve. It is obvious through the novel construction of a tandem valve assembly that the upstream and downstream valves are readily repairable without any necessity of removing the valves, the gas detection mechanism, or the valve operator structure therefrom. Repair may take place within a few minutes through the use of ordinary hand tools. Therefore, it is apparent that this invention is one well adapted to attain all of the objects hereinabove set forth together with other advantages which will become obvious and inherent from the description of the apparatus itself.

It will be understood that certain combinations and subcombinations are of utility and may be employed without reference to other features and subcombinations. This is contemplated by and is within the scope of the appended claims. As many possible embodiments may be made of the invention without departing from the spirit or scope thereof, it is to be understood that all matters herein set forth or as shown in the accompanying drawings are to be interpreted as illustrative and not in a limiting sense.

I claim:

1. A tandem valve assembly comprising a pair of valves connected together and defining a common flow passage, each of said valves comprising a valve body defining a valve chamber and having inlet and outlet flow passages in fluid communication with the valve chamber, a valve element disposed in each of said valve chambers and being movable between open and closed positions to control the flow of fluid through said flow passage, each of said valves having sealing means for engaging said valve elements, the sealing means of the upstream one of said valves being more susceptible to wear and erosion than the sealing means of the downstream one of said valves whereby any leakage which occurs due to wear or erosion will always occur first in said upstream valve, means for sensing leakage of fluid past the sealing means of said upstream one of said valves, whereby leakage of the upstream one of said valves may be immediately detected while positive sealing of the downstream valve is assured.

2. A tandem valve assembly as set forth in claim 1, said sealing means for each of said valves comprising upstream and downstream seat members means preventing sealing of the upstream seat of said downstream valve whereby fluid may flow into the valve chamber of the downstream valve in the closed position thereof.

3. A tandem valve assembly as recited in claim 2, said sensing conduit being communicated with said valve chamber of said downstream valve downstream of the upstream seat thereof, means preventing sealing of said upstream seat of said downstream valve whereby leaked fluid may enter the valve chamber of said downstream valve and exit through said conduit.

4. A tandem valve assembly as recited in claim 2, said means for sensing leakage from the upstream one of said valves comprising a conduit being disposed in fluid communication with said common flow passage at a location downstream of the downstream seat assembly of the upstream one of said valves, fluid sensing means connected to said conduit, means for introducing purging fluid into said common flow passage to eliminate any accumulation of undesired fluid between said valve.

5. A tandem valve assembly comprising an upstream valve and downstream valve, means connecting said valves to define a common flow passage, each of said valves comprising a valve body defining a valve chamber and having inlet and outlet passages being in fluid communication with the valve chamber, a valve element disposed in each of said valve chambers and being movable between open and closed positions to control the flow of fluid through the common flow passage, stem means for imparting movement to said valve elements, a valve actuating mechanism connected to said stem means for simultaneous actuation of said valve elements, each of said valves having upstream and downstream sealing members in engagement with said valve elements, the seat members of said upstream valve being more susceptible to wear and erosion than the seat members of said downstream valve, sensing means disposed in communication with said common flow passage at a location upstream of the downstream seat of the downstream valve whereby fluid leaking past said upstream valve may be detected while positive sealing of said downstream valve is assured.

6. A tandem valve assembly as set forth in claim 5, said means for sensing leakage comprising a conduit disposed in fluid communication with said common flow passage, a fluid leakage detector connected to said conduit and receiving leaked fluid therefrom, means for introducing purging fluid into said common flow passage between said valves to eliminate any accumulation of undesired fluid.

7. A tandem valve assembly as recited in claim 6, said sensing conduit providing an exit for said purging fluid.

References Cited

UNITED STATES PATENTS

| 2,200,310 | 5/1940 | Thayer | 137—557 |
| 2,430,122 | 11/1947 | Grace | 137—551 |
| 2,930,576 | 3/1960 | Sanctuary | 251—315 X |
| 2,982,305 | 5/1961 | Grove | 251—173 X |
| 3,075,552 | 1/1963 | Hunt. | |
| 3,398,761 | 8/1968 | Grove | 73—40.5 X |
| 3,428,366 | 2/1969 | Harvey | 137—240 X |
| 3,439,897 | 4/1969 | Priese | 251—172 X |

CLARENCE R. GORDON, Primary Examiner

U.S. Cl. X.R.

73—40.5; 137—551, 614, 614.11; 251—315